(12) United States Patent
Kamura et al.

(10) Patent No.: US 10,059,351 B2
(45) Date of Patent: Aug. 28, 2018

(54) RAILCAR BOGIE INCLUDING AXLE SPRING

(71) Applicant: KAWASAKI JUKOGYO KABUSHIKI KAISHA, Kobe-shi, Hyogo (JP)

(72) Inventors: Keiichiro Kamura, Kobe (JP); Naoki Wada, Kobe (JP); Masahiro Sakahira, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 494 days.

(21) Appl. No.: 14/431,546

(22) PCT Filed: Sep. 20, 2013

(86) PCT No.: PCT/JP2013/005572
§ 371 (c)(1),
(2) Date: Mar. 26, 2015

(87) PCT Pub. No.: WO2014/054235
PCT Pub. Date: Apr. 10, 2014

(65) Prior Publication Data
US 2015/0251670 A1    Sep. 10, 2015

(30) Foreign Application Priority Data

Oct. 3, 2012 (JP) ................................. 2012-221305

(51) Int. Cl.
*B61F 5/30* (2006.01)
*F16F 1/40* (2006.01)

(52) U.S. Cl.
CPC .............. *B61F 5/305* (2013.01); *F16F 1/403* (2013.01); *F16F 2230/24* (2013.01)

(58) Field of Classification Search
CPC ..................................................... B61F 5/305
(Continued)

(56) References Cited

U.S. PATENT DOCUMENTS 3,731,913 A * 5/1973 Hirst ...................... B61F 5/305
                                                              267/294
3,830,483 A * 8/1974 Gaydecki .................. F16F 1/40
                                                              105/224.1
(Continued)

FOREIGN PATENT DOCUMENTS

DE     2903520 B1 *  8/1980  ............. B60G 11/24
DE     3026528 A1 *  2/1982  ............. B61F 5/305
(Continued)

OTHER PUBLICATIONS

Nov. 19, 2013 International Search Report issued in International Application No. PCT/JP2013/005572.

*Primary Examiner* — Zachary L Kuhfuss
(74) *Attorney, Agent, or Firm* — Oliff PLC

(57) ABSTRACT

A railcar bogie includes: an axle box; a bogie frame; a pair of rubber springs, which are fixed to respective side surfaces of the axle box and the bogie frame; a pair of axle-box-side supporting members provided on respective lower portions of both the side surfaces of the axle box, the axle-box-side supporting members being configured to support the rubber springs when a fixed state between the rubber springs and the bogie frame as well as between the rubber springs and the axle box is released; and a pair of axle-box-side locking members each provided on top of the axle box in a removable manner, the axle-box-side locking members being configured to lock upper portions of the one ends of the rubber springs when the fixed state between the rubber springs and the bogie frame as well as between the rubber springs and the axle box is released.

15 Claims, 10 Drawing Sheets

(58) Field of Classification Search
USPC .................. 105/218.1, 224.05, 224.06, 224.1
See application file for complete search history.

(56) References Cited

U.S. PATENT DOCUMENTS

| | | | | |
|---|---|---|---|---|
| 5,611,284 A | * | 3/1997 | Smith ..................... | B61F 5/305 |
| | | | | 105/218.1 |
| 6,053,112 A | * | 4/2000 | Jones, Jr. .................. | B61F 5/50 |
| | | | | 105/157.1 |

FOREIGN PATENT DOCUMENTS

| | | | | |
|---|---|---|---|---|
| FR | 1522667 A | * | 4/1968 | .............. B61F 5/305 |
| FR | 2363469 A1 | * | 3/1978 | ................ B61F 3/02 |
| JP | S54135409 U | | 9/1979 | |
| JP | S60183258 A | | 9/1985 | |

\* cited by examiner

RAILCAR BOGIE INCLUDING AXLE SPRING

TECHNICAL FIELD

The present invention relates to railcar bogies including axle springs, and particularly to railcar bogies including rubber springs serving as axle springs, the rubber springs being provided on side surfaces of each axle box.

BACKGROUND ART

In general, a railcar bogie includes: a bogie frame; wheelsets, in each of which wheels are fitted to both sides of an axle; axle boxes respectively provided at both sides of each wheelset, the axle boxes housing bearings that support the wheelset in a rotatable manner; and axle springs. The bogie frame, the axle boxes, and the wheelsets are assembled together via the axle springs. Among such railcar bogies, there is a known railcar bogie in which rubber springs are utilized as the axle springs (see Patent Literature 1, for example). The bogie of Patent Literature 1 includes: chevron rubber springs extending from side surfaces of each axle box, the chevron rubber springs being fixed to the axle box in an inclined manner; and chevron rubber spring receivers provided between a bogie frame and the chevron rubber springs. The chevron rubber springs support the bogie frame via the chevron rubber spring receivers. The bogie of Patent Literature 1 is configured to expand the upper surface of each chevron rubber spring receiver, which is in contact with the bogie frame, by means of a plate-shaped member having a fan-like shape. According to Patent Literature 1, with such a configuration, stress that occurs to the bogie frame can be made uniform.

In such a bogie as disclosed in Patent Literature 1, in which each axle spring is disposed between the bogie frame and the side surfaces of the axle box, when the bogie frame is set on the axle spring, the axle spring is compressed by a load exerted from the bogie frame, and thereby spring force (resilient force) is generated. Owing to the spring force, friction force is exerted between the axle spring and the bogie frame as well as between the axle spring and the axle box, and thereby the axle spring is retained at its predetermined position.

CITATION LIST

Patent Literature

PTL 1: Japanese Laid-Open Patent Application Publication No. S60-183258

SUMMARY OF INVENTION

Technical Problem

In the bogie of Patent Literature 1, since each axle spring is disposed between the bogie frame and the side surfaces of the axle box, if the amount of compression of the axle spring is small, and the friction force exerted between the axle spring and the bogie frame as well as between the axle spring and the axle box is small, then the fixed state between the axle spring and the bogie frame as well as between the axle spring and the side surfaces of the axle box is released, which causes the axle spring to fall off or to be displaced. For this reason, in assembling work of putting the bogie frame and the axle boxes and wheelsets together, during the work of setting the bogie frame on the axle springs, until friction force capable of supporting the weight of the axle springs is exerted, it is necessary to keep supporting the axle springs from the outside so that the axle springs will not fall off or will not be displaced from their predetermined positions. Moreover, in disassembling work of separating the bogie frame and the axle boxes and wheelsets, the friction force decreases in the process of separating the bogie frame from the axle springs, which causes the axle springs to fall off. In order to prevent the axle springs from falling off, it is necessary to keep supporting the axle springs from the outside. For example, it is necessary to assign workers to keep supporting the axle springs. However, since workers need to be assigned to such supporting work, there is a problem in that the work cost increases, which results in an increase in the manufacturing cost or maintenance cost (the cost of the overall maintenance) of the bogie.

In view of the above, an object of the present invention is to provide a bogie that is capable of retaining each axle spring at its predetermined position with a simple structure when a fixed state between the axle spring and the bogie frame as well as between the axle spring and the axle box is released, while suppressing an increase in the manufacturing cost or maintenance cost of the bogie.

Solution to Problem

A railcar bogie according to the present invention includes: an axle box; a bogie frame surrounding both side surfaces of the axle box in a longitudinal direction of the bogie and an upper surface of the axle box; a pair of rubber springs interposed between the bogie frame and both the side surfaces of the axle box, respectively, such that one ends of the rubber springs are fixed to the respective side surfaces of the axle box, and such that other ends of the rubber springs are fixed to the bogie frame; a pair of axle-box-side supporting members provided on respective lower portions of both the side surfaces of the axle box, the axle-box-side supporting members being configured to support the rubber springs by contacting lower portions of the one ends of the rubber springs from below when a fixed state between the rubber springs and the bogie frame as well as between the rubber springs and the axle box is released; and a pair of axle-box-side locking members each provided on top of the axle box in a removable manner, the axle-box-side locking members being configured to lock upper portions of the one ends of the rubber springs when the fixed state between the rubber springs and the bogie frame as well as between the rubber springs and the axle box is released.

The above-described configuration makes it possible to retain the rubber springs at the axle box side with a simple structure even if the fixed state between the axle spring and the bogie frame as well as between the axle spring and the axle box is released, while suppressing an increase in manufacturing cost or maintenance cost.

Another railcar bogie according to the present invention includes: an axle box; a bogie frame surrounding both side surfaces of the axle box in a longitudinal direction of the bogie and an upper surface of the axle box; a pair of rubber springs interposed between the bogie frame and both the side surfaces of the axle box, respectively, such that one ends of the rubber springs are fixed to the respective side surfaces of the axle box, and such that other ends of the rubber springs are fixed to the bogie frame; a pair of bogie-frame-side supporting members provided, in a removable manner, on respective lower portions of fixing portions of the bogie frame to which the rubber springs are fixed, the bogie-frameside supporting members being configured to support the rubber springs by contacting lower portions of the other ends of the rubber springs from below when a fixed state between the rubber springs and the bogie frame as well as between the rubber springs and the axle box is released; and a pair of bogie-frame-side locking members provided above the respective fixing portions of the bogie frame to which the rubber springs are fixed, the bogie-frame-side locking members being configured to lock upper portions of the other ends of the rubber springs when the fixed state between the rubber springs and the bogie frame as well as between the rubber springs and the axle box is released.

The above-described configuration makes it possible to retain the rubber springs at the bogie frame side with a simple structure even if the fixed state between the axle spring and the bogie frame as well as between the axle spring and the axle box is released, while suppressing an increase in manufacturing cost or maintenance cost.

Yet another railcar bogie according to the present invention includes: an axle box; a bogie frame surrounding both side surfaces of the axle box in a longitudinal direction of the bogie and an upper surface of the axle box; a pair of rubber springs interposed between the bogie frame and both the side surfaces of the axle box, respectively, such that one ends of the rubber springs are fixed to the respective side surfaces of the axle box, and such that other ends of the rubber springs are fixed to the bogie frame; a pair of axle-box-side supporting members provided on respective lower portions of both the side surfaces of the axle box, the axle-box-side supporting members being configured to support the rubber springs by contacting lower portions of the one ends of the rubber springs from below when a fixed state between the rubber springs and the bogie frame as well as between the rubber springs and the axle box is released; a pair of axle-box-side locking members each provided on top of the axle box in a removable manner, the axle-box-side locking members being configured to lock upper portions of the one ends of the rubber springs when the fixed state between the rubber springs and the bogie frame as well as between the rubber springs and the axle box is released; a pair of bogie-frame-side supporting members provided, in a removable manner, on respective lower portions of fixing portions of the bogie frame to which the rubber springs are fixed, the bogie-frame-side supporting members being configured to support the rubber springs by contacting lower portions of the other ends of the rubber springs from below when the fixed state between the rubber springs and the bogie frame as well as between the rubber springs and the axle box is released; and a pair of bogie-frame-side locking members provided above the respective fixing portions of the bogie frame to which the rubber springs are fixed, the bogie-frame-side locking members being configured to lock upper portions of the other ends of the rubber springs when the fixed state between the rubber springs and the bogie frame as well as between the rubber springs and the axle box is released.

The above-described configuration makes it possible to retain the rubber springs at the axle box side or at the bogie frame side with a simple structure even if the fixed state between the axle spring and the bogie frame as well as between the axle spring and the axle box is released, while suppressing an increase in manufacturing cost or maintenance cost.

Advantageous Effects of Invention

As is clear from the above description, the present invention makes it possible to provide a bogie that is capable of retaining each axle spring at its predetermined position with a simple structure even if a fixed state between the axle spring and the bogie frame as well as between the axle spring and the axle box is released, while suppressing an increase in the manufacturing cost or maintenance cost of the bogie.

DESCRIPTION OF EMBODIMENTS

Hereinafter, railcar bogies according respective embodiments are described with reference to the drawings.

Embodiment 1

Figure 1:
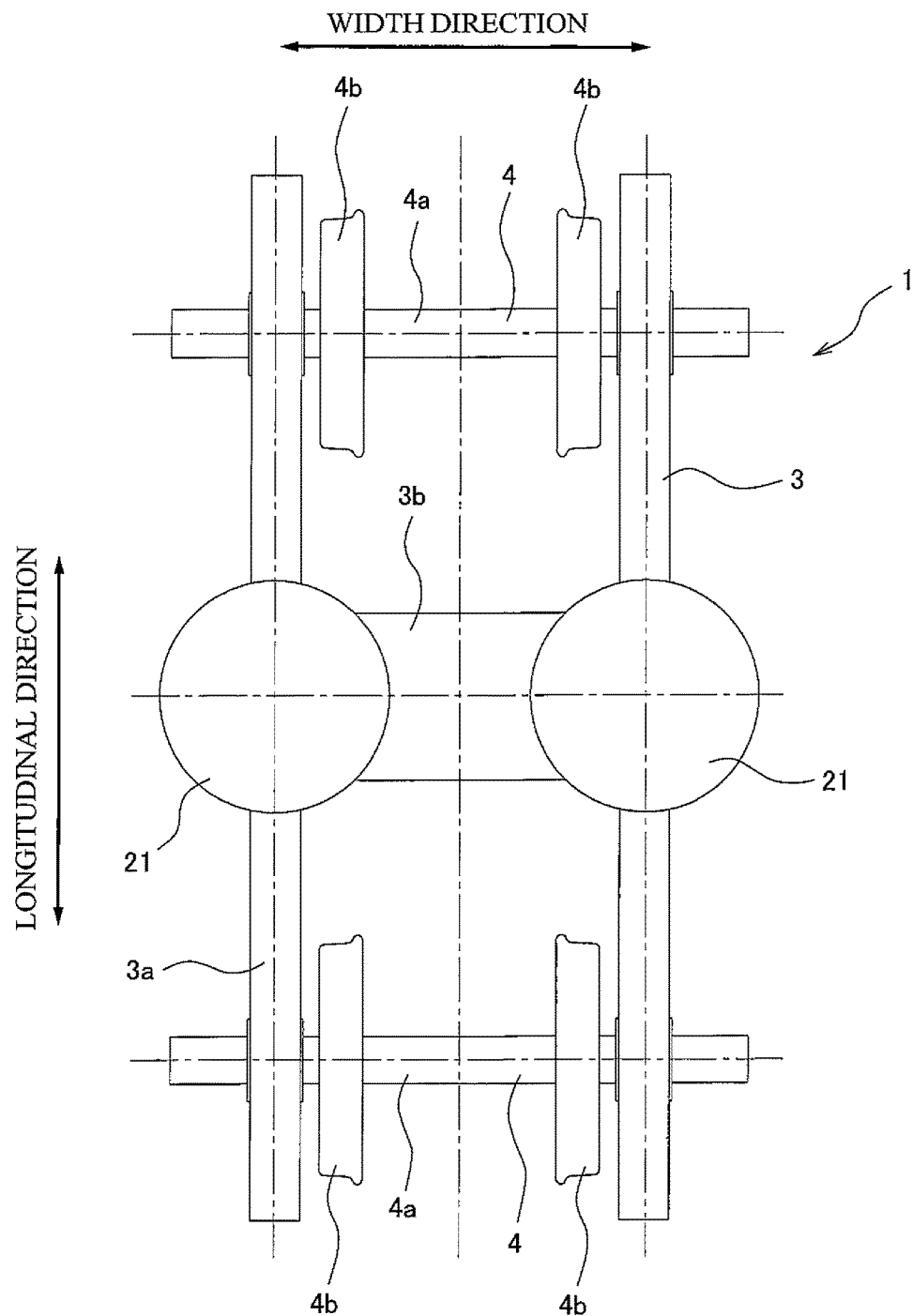
FIG. 1 is a plan view of a railcar bogie according to Embodiment 1.
Figure 2:
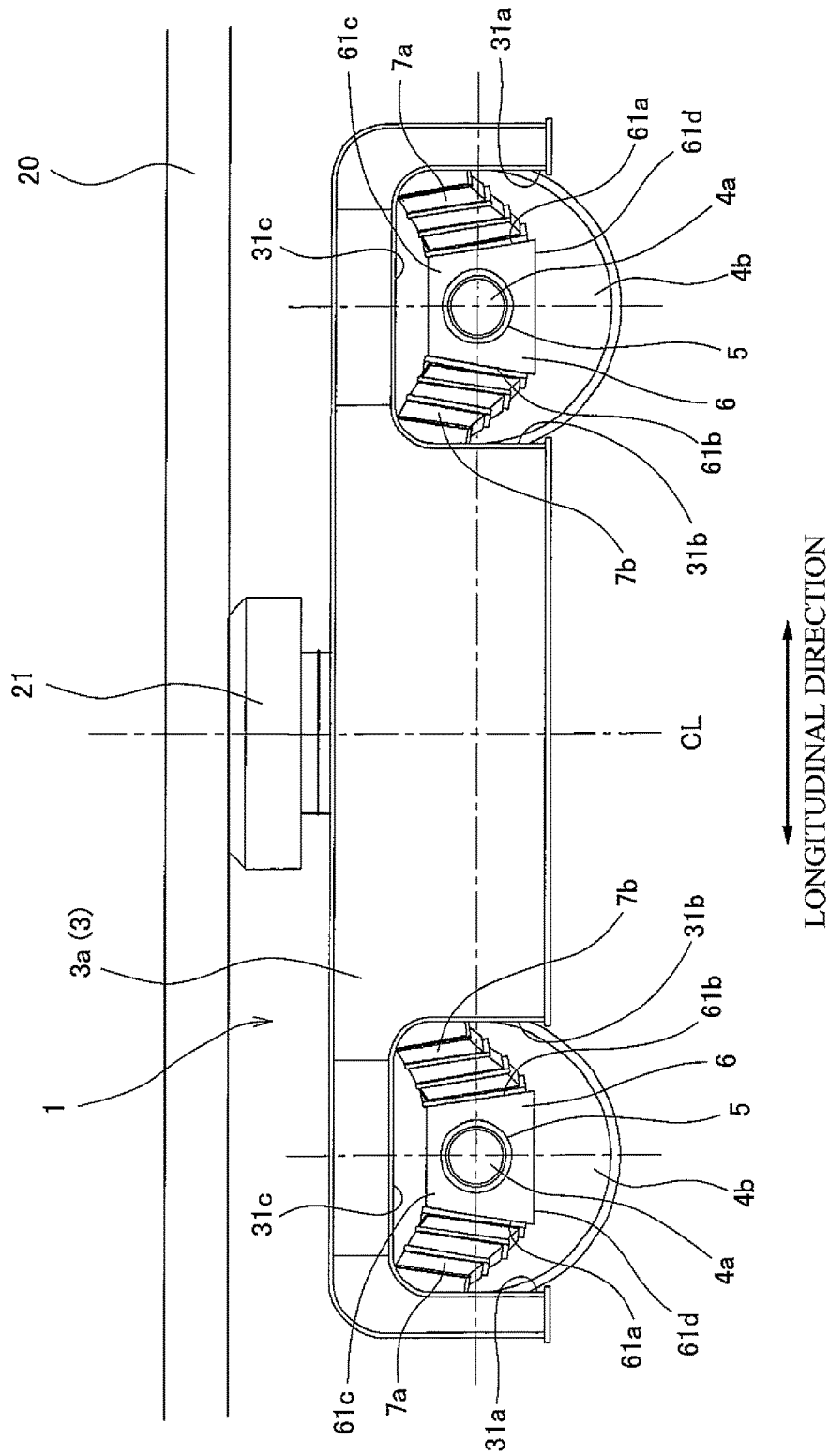
FIG. 2 is a side view of the railcar bogie shown in FIG. 1.
Figure 3:
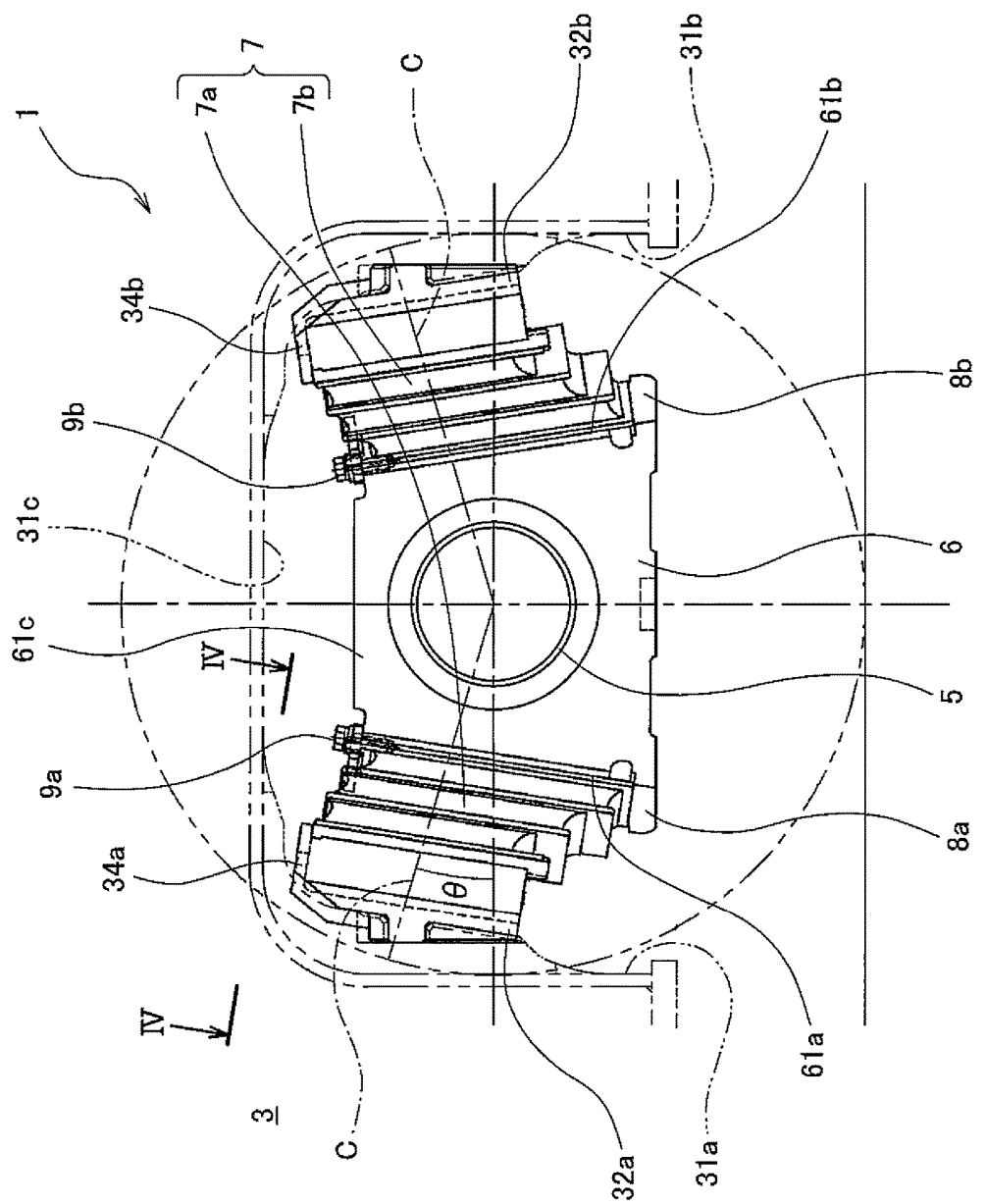
FIG. 3 is an essential-part enlarged view showing the vicinity of an axle box of the railcar bogie of FIG. 2.

FIG. 1 is a plan view of a railcar bogie 1 according to Embodiment 1. FIG. 2 is a side view of the railcar bogie 1 (hereinafter, the railcar bogie 1 may be simply referred to as "the bogie"). FIG. 3 is an essential-part enlarged view showing the vicinity of an axle box 6 of FIG. 2. FIG. 2 shows a center line CL of the bogie, which indicates the central position of the bogie 1 in the longitudinal direction of the bogie. In the description below, the longitudinal direction of the bogie is simply referred to as "the longitudinal direction", and the width direction of the bogie is simply referred to as "the width direction". (In the description herein, a direction perpendicular to the axles 4*a* in the plan view of FIG. 1 (i.e., a travelling direction or a front-rear direction) is defined as "the longitudinal direction", and the axial direction of the axles 4*a* (i.e., a left-right direction) is defined as "the width direction".) In the description below, terms "inner side" and "outer side" refer to the inner side and the outer side of the bogie 1 in the longitudinal direction with respect to the center line CL unless otherwise specified, and the up-down direction corresponds to the vertical up-down direction. In the drawings, the same or corresponding elements are denoted by the same reference signs, and the bogie 1 is symmetrical in the longitudinal direction with respect to the center line CL of the bogie.

(Schematic Structure of Overall Railcar Bogie)

As shown in FIG. 1 to FIG. 3, the bogie 1 includes a bogie frame 3, wheelsets 4, bearings 5, axle boxes 6, axle springs 7, and bolster springs 21. The bogie frame 3 includes, at both sides thereof in the width direction, a pair of side beams 3a each extending in the longitudinal direction, and also includes a cross beam 3b, which extends in the width direction in such a manner as to connect between the side beams 3a at their central portions in the longitudinal direction. The bogie frame 3 supports a carbody 20 of the railcar via the bolster springs 21. The wheelsets 4 include respective axles 4a, which are arranged at both sides of the bogie frame 3 in the longitudinal direction, and each wheelset 4 includes a pair of wheels 4b. The wheels 4b are fitted to both sides, respectively, of the axle 4a in the width direction. The bearings 5 are provided at the outer side of the respective wheels 4b in the width direction, and support the wheelsets 4 in a rotatable manner. The axle boxes 6 are provided corresponding to the respective bearings 5, and house the respective bearings 5 therein. Each axle spring 7 includes a pair of rubber springs (chevron rubber springs) 7a and 7b. The axle springs 7 connect the respective axle boxes 6 to the bogie frame 3 in such a manner as to support the bogie frame 3 on the axle boxes 6.

As shown in FIG. 2, each axle box 6 has a surface facing the outer side in the longitudinal direction and a surface facing the inner side in the longitudinal direction, i.e., side surfaces (both side surfaces) 61a and 61b in the longitudinal direction. In the description herein, of the side surfaces of the axle box 6, the side surface facing the outer side is referred to as an outer side surface 61a, and the side surface facing the inner side is referred to as an inner side surface 61b. As described below, one end of the chevron rubber spring 7a is fixed to the outer side surface 61a of the axle box 6, and one end of the chevron rubber spring 7b is fixed to the inner side surface 61b of the axle box 6. The size of an upper surface 61c of the axle box 6 is less than the size of a lower surface 61d of the axle box 6. That is, when seen in side view, the axle box 6 is in a substantially trapezoidal shape whose upper portion is small, and both the side surfaces 61a and 61b face obliquely upward. Accordingly, the axle box 6 supports, from obliquely downward, the chevron rubber springs 7a and 7b fixed to both the side surfaces 61a and 61b.

Each side beam 3a of the bogie frame 3 includes: first facing portions 31a facing the outer side surfaces 61a of the axle boxes 6; second facing portions 31b facing the inner side surfaces 61b of the axle boxes 6; and third facing portions 31c facing the upper surfaces 61c of the axle boxes 6. That is, the bogie frame 3 is configured to surround both the side surfaces 61a and 61b of each axle box 6 in the longitudinal direction and the upper surface 61c of each axle box 6. The bogie frame 3 further includes: rubber spring receivers 32a and 32b; and displacement preventing portions 34a and 34b provided at the top of the rubber spring receivers 32a and 32b. The rubber spring receivers 32a and 32b are members to which the other ends of the chevron rubber springs 7a and 7b are fixed. The rubber spring receiver 32a is provided on the first facing portion 31a, and projects toward the outer side surface 61a of the axle box 6. Similarly, the rubber spring receiver 32b is provided on the second facing portion 31b, and projects toward the inner side surface 61b of the axle box 6. The rubber spring receivers 32a and 32b herein are arranged such that they are spaced apart from the third facing portion 31c. In other words, the third facing portion 31c is positioned above the rubber spring receivers 32a and 32b. In the bogie 1, these rubber spring receivers 32a and 32b serve as fixing portions to which the other ends of the chevron rubber springs 7a and 7b are fixed. The displacement preventing portions 34a and 34b are provided in such a manner that when the chevron rubber springs 7a and 7b are fixed to the rubber spring receivers 32a and 32b, the displacement preventing portions 34a and 34b are positioned over the other ends of the chevron rubber springs 7a and 7b. The displacement preventing portions 34a and 34b are members that prevent the chevron rubber springs 7a and 7b from moving upward.

Figure 4:
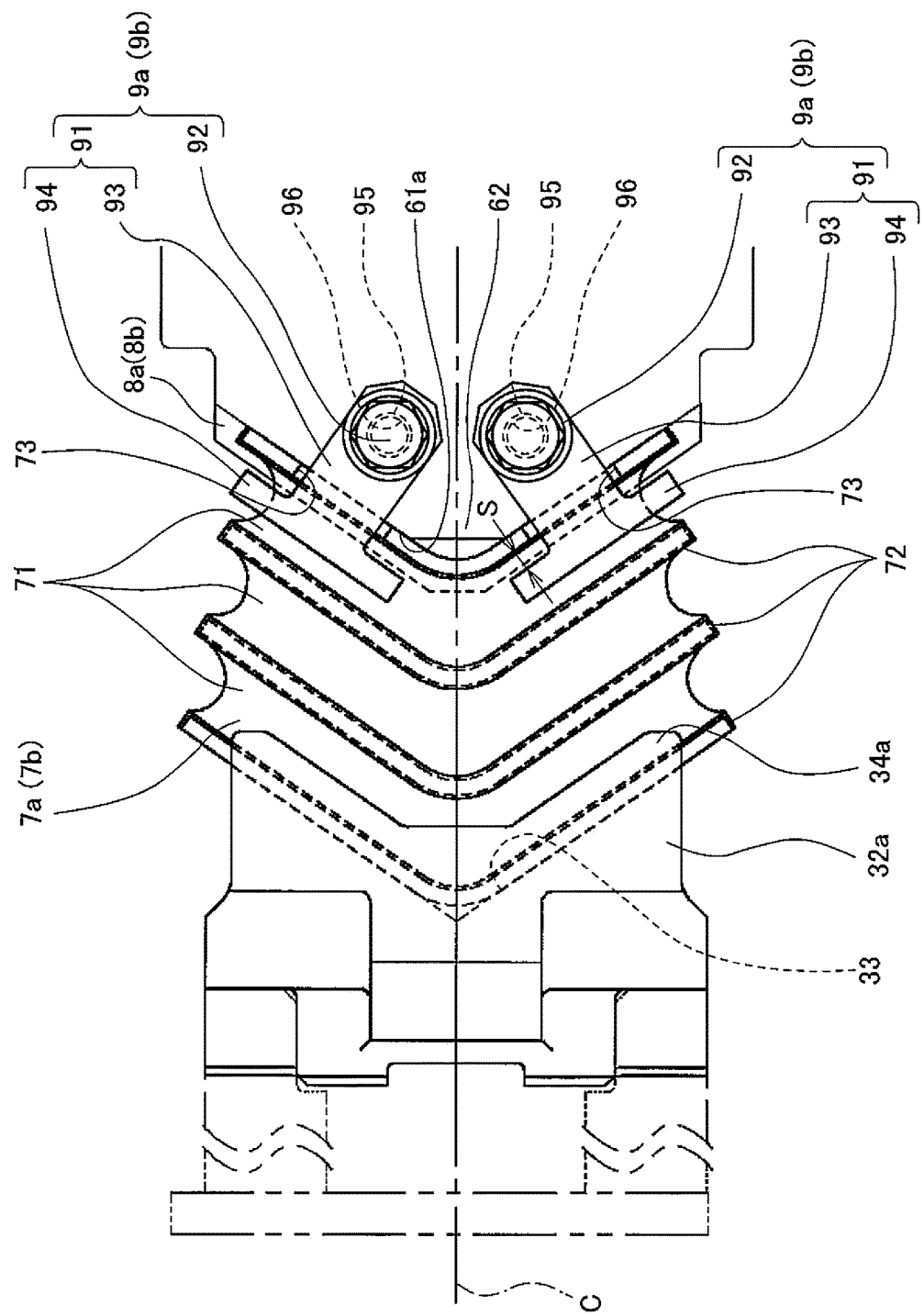
FIG. 4 is a view of the structure in the vicinity of the axle box of the railcar bogie shown in FIG. 3, the view being taken along line IV-IV of FIG. 3 and seen in the direction of the arrows of line IV-IV.

FIG. 4 is a view of the structure in the vicinity of the axle box 6 of the bogie 1 shown in FIG. 3, the view being taken along line IV-IV of FIG. 3 and seen in the direction of the arrows of line IV-IV. It should be noted that FIG. 4 shows the bogie 1 in an assembled state where the bogie frame 3 and the axle boxes 6 and wheelsets 4 are put together (which will be described below). As shown in FIG. 4, each of the chevron rubber springs 7a and 7b is a layered rubber spring configured such that a plurality of elastic layers 71 formed of rubber and a plurality of hard layers 72 formed of metal, each of which is substantially V-shaped when seen in plan view, are alternately stacked in the direction of a central axis C. Each of the chevron rubber springs 7a and 7b is configured such that the layers at both ends in the direction of the central axis C are formed as the hard layers 72. One end of the chevron rubber spring 7a is fixed to the outer side surface 61a of the axle box 6; one end of the chevron rubber spring 7b is fixed to the inner side surface 61b of the axle box 6; the other end of the chevron rubber spring 7a is fixed to the rubber spring receiver 32a of the bogie frame 3; and the other end of the chevron rubber spring 7b is fixed to the rubber spring receiver 32b of the bogie frame 3. In this manner, each of the chevron rubber springs 7a and 7b is interposed between the bogie frame 3 and the axle box 6. Specifically, the chevron rubber spring 7a is interposed between the outer side surface 61a of the axle box 6 and the first facing portion 31a of the bogie frame 3, and is obliquely disposed such that the chevron rubber spring 7a extends outwardly upward from the outer side surface 61a of the axle box 6. Similarly, the chevron rubber spring 7b is interposed between the inner side surface 61b of the axle box 6 and the second facing portion 31b of the bogie frame 3, and is obliquely disposed such that the chevron rubber spring 7b extends inwardly upward from the inner side surface 61b of the axle box 6. The one end of each of the chevron rubber springs 7a and 7b herein is the recessed side of the V shape, and the other end of each of the chevron rubber springs 7a and 7b is the protruding side of the V shape. Crest portions 62 are formed on both the side surfaces 61a and 61b of the axle box 6, respectively, such that the crest portions 62 fit in the recesses of the V shapes of the one ends of the chevron rubber springs 7a and 7b. Valley portions 33 are formed in the rubber spring receivers 32a and 32b, respectively, such that the valley portions 33 fit on the protrusions of the V shapes of the other ends of the chevron rubber springs 7a and 7b. The central axis C of each of the chevron rubber springs 7a and 7b forms a predetermined angle θ with the horizontal plane (e.g., 5° to 15°). Both ends of the chevron rubber springs 7a and 7b herein are not adhered, or the like, to the bogie frame 3 and the side surfaces 61a and 61b of the axle box 6. However, since the chevron rubber springs 7a and 7b are compressed when supporting the bogie frame 3, spring force is generated. Consequently, friction force is exerted between the chevron rubber springs 7a and 7b and the bogie frame 3 as well as between the chevron rubber springs 7a and 7b and the axle box 6, and thereby the chevron rubber springs 7a and 7b are retained at their predetermined positions.

In the description below, in order to clarify assembling work and disassembling work that cause the problems described above, first, an assembled state where the bogie frame 3 and wheelset units are put together (axle boxes 6 (including bearings 5) and a wheelset 4 are collectively referred to as a "wheelset unit"), and a disassembled state where the bogie frame 3 and the wheelset units are separated, are described. Then, assembling work of putting the bogie frame 3 and the wheelset units together, and disassembling work of separating the bogie frame 3 and the wheelset units, are described.

When the bogie frame 3 and the wheelset units are in the assembled state, the chevron rubber springs 7a and 7b are interposed between the bogie frame 3 and the wheelset units, and the chevron rubber springs 7a and 7b support a load exerted from the bogie frame 3. In the assembled state, the chevron rubber springs 7a and 7b are compressed by the load exerted from the bogie frame 3. Owing to the compression, spring force (resilient force) is generated in the direction of the central axis C. Owing to the spring force, friction force is exerted between the chevron rubber springs 7a and 7b and the bogie frame 3 as well as between the chevron rubber springs 7a and 7b and each axle box 6, and thereby the chevron rubber springs 7a and 7b are retained at their predetermined positions.

On the other hand, when the bogie frame 3 and the wheelset units are in the disassembled state, the bogie frame 3 is supported by force exerted from the outside (e.g., the bogie frame 3 is supported by a crane, jack, or the like). The load exerted on the chevron rubber springs 7a and 7b from the bogie frame 3 in the disassembled state is less than that in the assembled state, and also, the amount of compression, i.e., the spring force, of the chevron rubber springs 7a and 7b in the disassembled state is small. Therefore, in the disassembled state, the friction force exerted between the chevron rubber springs 7a and 7b and the bogie frame 3 as well as between the chevron rubber springs 7a and 7b and each axle box 6 is small, and the weight of the chevron rubber springs 7a and 7b cannot be supported. As a result, the chevron rubber springs 7a and 7b fall off, or become displaced. That is, in the disassembled state, the fixed state between the chevron rubber springs 7a and 7b and the rubber spring receivers 32a and 32b of the bogie frame 3 as well as between the chevron rubber springs 7a and 7b and both the side surfaces 61a and 61b of the axle box 6 is released. For this reason, without support from the outside, the bogie 1 is unable to retain the chevron rubber springs 7a and 7b at their predetermined positions.

It should be noted that work of changing the disassembled state into the assembled state is herein referred to as assembling work. For example, the assembling work includes work of putting the bogie frame 3 and the wheelset units together into the assembled state from a completely separated state. Also, work of changing the assembled state into the disassembled state is herein referred to as disassembling work. For example, the disassembling work includes work of completely separating the bogie 1 in the assembled state into the bogie frame 3 and the wheelset units.

(Structure for Retaining Axle Spring)

As described above, in the bogie 1 according to the present embodiment, the chevron rubber springs 7a and 7b are not adhered, or the like, to the bogie frame 3 and the axle box 6. Therefore, in the disassembled state, the fixed state between the chevron rubber springs 7a and 7b and the rubber spring receivers 32a and 32b of the bogie frame 3 as well as between the chevron rubber springs 7a and 7b and both the side surfaces 61a and 61b of the axle box 6 is released. As a result, the chevron rubber springs 7a and 7b fall off or become displaced. In order to prevent such falling or displacement, the bogie 1 according to the present embodiment includes a structure for retaining the chevron rubber springs 7a and 7b in the disassembled state.

As shown in FIG. 3, the bogie 1 includes a pair of axle-box-side supporting members 8a and 8b as a structure for retaining the chevron rubber springs 7a and 7b. The axle-box-side supporting members 8a and 8b are integrally formed on the axle box 6. The axle-box-side supporting members 8a and 8b project substantially horizontally from respective lower portions of both the side surfaces 61a and 61b of the axle box 6, such that the supporting members 8a and 8b are positioned under the one ends of the respective chevron rubber springs 7a and 7b. In the disassembled state, the axle-box-side supporting members 8a and 8b contact the lower portions of the one ends of the chevron rubber springs 7a and 7b from below, thereby supporting the chevron rubber springs 7a and 7b. Accordingly, the shape and size of the axle-box-side supporting members 8a and 8b may be any shape and size, so long as the axle-box-side supporting members 8a and 8b are capable of supporting the load of the chevron rubber springs 7a and 7b. For example, the shape and size of the axle-box-side supporting members 8a and 8b may be as follows: the length in the projecting direction (i.e., the length in the longitudinal direction from each of the side surfaces 61a and 61b of the axle box 6) is 5 to 10 mm; the thickness is 15 to 20 mm; and the length in the width direction is substantially the same as that of the chevron rubber springs 7a and 7b positioned on the axle-box-side supporting members 8a and 8b. The upper surfaces of the axle-box-side supporting members 8a and 8b are preferably flat so that the chevron rubber springs 7a and 7b can be stably supported in the disassembled state.

The bogie 1 further includes a pair of axle-box-side locking members 9a and 9b, which is provided on the top of the axle box 6 in a removable manner, such that the locking members 9a and 9b are positioned above the one ends of the respective chevron rubber springs 7a and 7b. In the disassembled state, the axle-box-side locking members 9a and 9b connect between the upper portion of the axle box 6 and the chevron rubber springs 7a and 7b, and lock the upper portions of the one ends of the chevron rubber springs 7a and 7b so that the upper portions of the one ends of the chevron rubber springs 7a and 7b will not be spaced apart from the side surfaces 61a and 61b of the axle box 6 by a certain space (e.g., 5 to 10 mm) or more. In this manner, the chevron rubber springs 7a and 7b supported by the axle-box-side supporting members 8a and 8b can be prevented from tilting downward to fall off or to become displaced.

Figure 5:
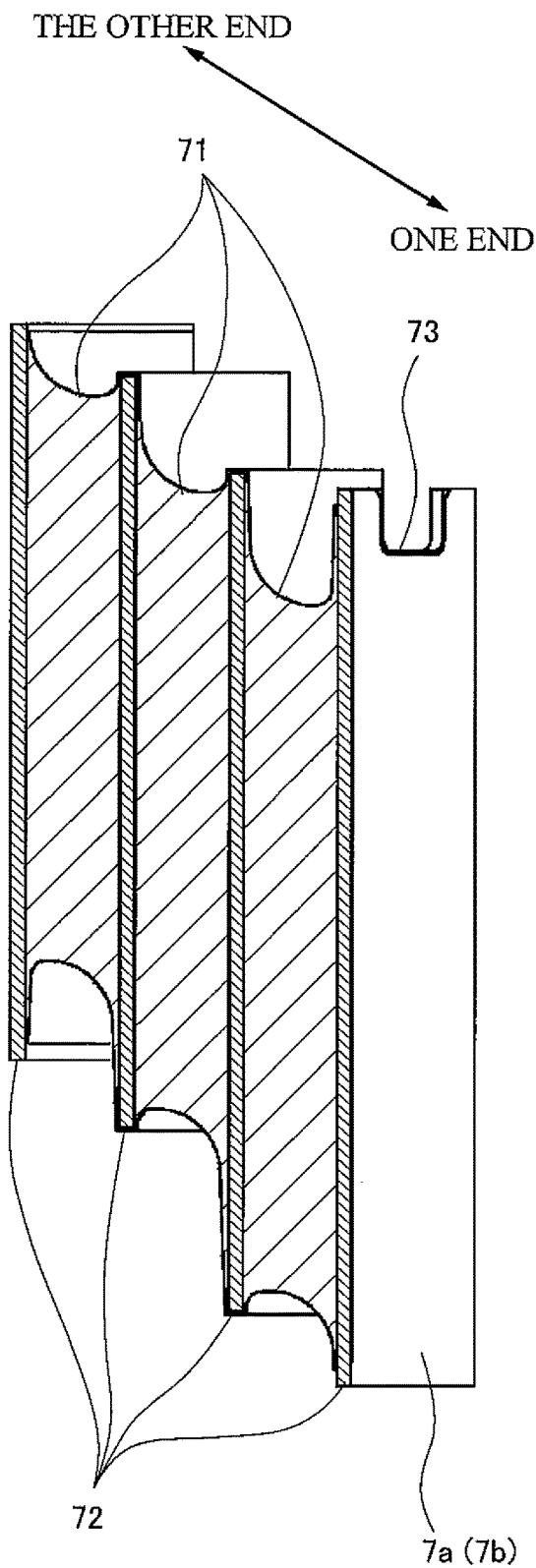
FIG. 5 is a perspective view showing each chevron rubber spring of the railcar bogie of FIG. 2, the chevron rubber spring being cut in half.

FIG. 5 is a perspective view showing the chevron rubber spring 7a or 7b of the bogie 1, the chevron rubber spring being cut in half (showing one of the symmetrical portions of the V-shape). As shown in FIG. 5, in the bogie 1 according to the present embodiment, a notch 73 is formed in the upper portion of the hard layer 72 of the one end of each of the chevron rubber springs 7a and 7b. The hard layer 72 extends upward beyond the upper end of the adjacent elastic layer 71. As shown in FIG. 4, each of the axle-box-side locking members 9a and 9b includes a stopper 91 and a fastener 92. The stopper 91 is a plate-shaped member, which is substantially T-shaped when seen in plan view. The stopper 91 includes a neck portion 93 and a head portion 94. A through-hole 95 is formed in one end of the neck portion 93, and the head portion 94 is formed at the other end of the neck portion 93. The fastener 92 is inserted in the through-hole 95 of the stopper 91, thereby fastening the stopper 91 to the upper portion of the axle box 6. The fastener 92 herein is a bolt 92, and is screwed into a screw hole 96 formed in the upper portion of the axle box 6. It should be noted that each of the axle-box-side locking members 9a and 9b may be constituted by a plurality of sets of stoppers 91 and fasteners 92, each set including one stopper 91 and one fastener 92. In the present embodiment, each of the axle-box-side locking members 9a and 9b is constituted by two sets of stoppers 91 and fasteners 92, which are arranged such that the two sets are spaced apart from each other in the width direction, so that the upper portion of the hard layer 72 of each of the chevron rubber springs 7a and 7b can be locked with a proper balance in the width direction. Each stopper 91 is disposed such that the neck portion 93 is positioned in the notch 73, and the head portion 94 is positioned above the elastic layer 71 that is adjacent to the hard layer 72 of the one end of the chevron rubber spring 7a or 7b. The head portion 94 is larger than the notch 73. In the disassembled state, the head portions 94 contact the hard layers 72, and thereby the upper portion of the axle box 6 and the chevron rubber springs 7a and 7b are connected, and the chevron rubber springs 7a and 7b are locked so that the chevron rubber springs 7a and 7b will not be spaced apart from the side surfaces 61a and 61b of the axle box 6 by a certain space or more. In the assembled state, owing to the spring force of the chevron rubber springs 7a and 7b, friction force is exerted between the chevron rubber springs 7a and 7b and the bogie frame 3 as well as between the chevron rubber springs 7a and 7b and the axle box 6, and thereby the chevron rubber springs 7a and 7b are retained at their predetermined positions. Therefore, in the assembled state, a gap S may be formed between the hard layer and each of the head portions 94 of the axle-box-side locking members 9a and 9b, and thereby the axle-box-side locking members 9a and 9b may be prevented from locking the chevron rubber springs 7a and 7b in the assembled state.

Hereinafter, regarding the bogie 1 according to the present embodiment, the assembling work of putting the bogie frame 3 and the wheelset units together is described. The description below describes the assembling work, in which the bogie frame 3 and the wheelset units are put together into the assembled state from a completely separated state. In the assembling work of the bogie 1, in which the bogie frame 3 and the wheelset units are put together, first, the wheelsets 4 to which the bearings 5 and the axle boxes 6 are fitted are arranged such that their axles 4a are away from each other by a certain distance in the longitudinal direction. At the time, the axles 4a of the respective wheelsets 4 are arranged such that the axles 4a are parallel to each other and not displaced from each other in the width direction. Thereafter, the chevron rubber springs 7a and 7b are mounted on the axle-box-side supporting members 8a and 8b of each axle box 6, such that the hard layers 72 of the one ends of the chevron rubber springs 7a and 7b are in contact with the crest portions 62 of the side surfaces 61a and 61b of the axle box 6. Next, the stoppers 91 are placed such that the stoppers 91 pass through the notches 73, which are formed in the upper portions of the hard layers 72 of the one ends of the chevron rubber springs 7a and 7b, and the stoppers 91 are fastened to the axle box 6 by the fasteners 92. As a result, the upper portions of the one ends of the chevron rubber springs 7a and 7b are locked by the axle-box-side locking members 9a and 9b so that the upper portions of the one ends of the chevron rubber springs 7a and 7b will not be spaced apart from the side surfaces 61a and 61b of the axle box 6 by a certain space or more. Then, in a state where the chevron rubber springs 7a and 7b are retained on the side surfaces 61a and 61b of each axle box 6, the bogie frame 3 is set on the chevron rubber springs 7a and 7b from above, and thus the assembling work is completed. When the bogie frame 3 is set, the bogie frame 3 is positioned such that the hard layers 72 of the other ends of the chevron rubber springs 7a and 7b are in contact with the valley portions 33 of the rubber spring receivers 32a and 32b of the bogie frame 3. When the bogie frame 3 is set, the chevron rubber springs 7a and 7b are compressed by the load of the bogie frame 3, and thereby spring force (resilient force) is generated. As a result, owing to the spring force, friction force is exerted between the chevron rubber springs 7a and 7b and the bogie frame 3 as well as between the chevron rubber springs 7a and 7b and the axle box 6, and thereby the chevron rubber springs 7a and 7b are retained at their predetermined positions. As described above, during the assembling work of the bogie 1, the chevron rubber springs 7a and 7b are supported by the axle-box-side supporting members 8a and 8b from below, and the upper portions of the one ends of the chevron rubber springs 7a and 7b are locked by the axle-box-side locking members 9a and 9b. Consequently, the chevron rubber springs 7a and 7b are retained on the side surfaces 61a and 61b of the axle box 6.

Next, regarding the bogie 1 according to the present embodiment, the disassembling work of separating the bogie frame 3 and the wheelset units is described. The description below describes the disassembling work, in which the bogie frame 3 and the wheelset units that are in the assembled state are disassembled into a completely separated state. In the disassembling work, the bogie frame 3 is supported by external force added by a crane or the like. As a result, the load that is exerted from the bogie frame 3 onto the chevron rubber springs 7a and 7b decreases, and also, the spring force decreases. Consequently, the friction force exerted between the chevron rubber springs 7a and 7b and the bogie frame 3 as well as between the chevron rubber springs 7a and 7b and the axle box 6 decreases. This tends to cause the fixed state between the chevron rubber springs 7a and 7b and the rubber spring receivers 32a and 32b of the bogie frame 3 as well as between the chevron rubber springs 7a and 7b and both the side surfaces 61a and 61b of the axle box 6 to be released, and cause falling or displacement of the chevron rubber springs 7a and 7b. However, in the case of the bogie 1, during the disassembling work, the chevron rubber springs 7a and 7b are supported by the axle-box-side supporting members 8a and 8b from below, and the upper portions of the one ends of the chevron rubber springs 7a and 7b are locked by the axle-box-side locking members 9a and 9b. Accordingly, the chevron rubber springs 7a and 7b are retained on the side surfaces 61a and 61b of the axle box 6. It should be noted that, in the case of removing the chevron rubber springs 7a and 7b from the axle box 6 after the disassembling work of the bogie 1, the chevron rubber springs 7a and 7b can be removed by merely removing the axle-box-side locking members 9a and 9b.

As described above, with the simple structure including the axle-box-side supporting members 8a and 8b and the axle-box-side locking members 9a and 9b, the bogie 1 according to the present embodiment can retain the chevron rubber springs 7a and 7b at the axle box 6 side even if the bogie frame 3 and the wheelset units are in the disassembled state, while suppressing an increase in the manufacturing cost or maintenance cost of the bogie 1. That is, even if the fixed state between the chevron rubber springs 7a and 7b and the bogie frame 3 as well as between the chevron rubber springs 7a and 7b and the axle box 6 is released, the chevron rubber springs 7a and 7b can be retained at the axle box 6 side. Although the assembling work and disassembling work of conventional bogies require workers to support the chevron rubber springs provided for each axle box, the bogie 1 according to the present embodiment requires no workers to be assigned to such supporting work. This makes it possible to reduce the manufacturing cost or maintenance cost of the bogie 1.

Although the bogie according to the present embodiment is configured such that the axle-box-side supporting members are integrally formed on the axle box, the axle-box-side supporting members are not thus limited. For example, the axle-box-side supporting members may be provided on the axle box in a detachable manner by means of fastening, magnetic force, adhesion, etc.

It should be noted that the shape of the stoppers of the axle-box-side locking members of the bogie according to the present embodiment is not limited to the above-described shape. For example, the stoppers may be in a straight shape when seen in plan view and a substantially L shape when seen in sectional view. In such a case, the notches in the hard layers of the one ends of the chevron rubber springs may be eliminated, and the stoppers may be simply hooked to the upper portions of the hard layers. The manner of fitting the stoppers is not limited to fastening, but may be, for example, fitting by means of magnetic force or adhesion. The positions where the stoppers are arranged are not limited to positions on the upper surface of the axle box, but may be, for example, upper positions on both surfaces of the axle box in the width direction.

In the bogie according to the present embodiment, the axle-box-side locking members are provided in a removable manner. Therefore, when the bogie is neither in the assembling work nor in the disassembling work (e.g., during running), the axle-box-side locking members may be removed from the bogie. The same is true of the aforementioned case where the axle-box-side supporting members are detachably provided.

In the bogie according to the present embodiment, the chevron rubber springs are used as rubber springs. Each chevron rubber spring is configured such that the elastic layers formed of rubber and the hard layers formed of metal, each of which is substantially V-shaped when seen in plan view, are stacked. However, the rubber springs are not limited to such chevron rubber springs. For example, the rubber springs may be configured such that flat plate-shaped elastic layers and hard layers are stacked. Although the rubber springs are obliquely arranged in the above description, the arrangement is not thus limited. Alternatively, horizontal arrangement may be adopted.

In the bogie according to the present embodiment, only the rubber springs (chevron rubber springs) serve as the axle springs. However, as an alternative, so long as the rubber springs are arranged on the side surfaces of the axle box, other springs such as coil springs or air springs may be used together with the rubber springs. In this case, for example, the coil springs or air springs may be set on the upper surface of the axle box in such a manner as not to interfere with the axle-box-side locking members.

Embodiment 2

The fundamental structure according to Embodiment 2 is similar to that according to Embodiment 1 described above. In a description below regarding a bogie 1b according to Embodiment 2, only the differences from Embodiment 1 are described. The same components as those described in Embodiment 1 are denoted by the same reference signs as those used in Embodiment 1, and the description of such components is omitted.

(Structure for Retaining Axle Spring)

Unlike Embodiment 1, the bogie 1b according to Embodiment 2 does not include the axle-box-side supporting members 8a and 8b and the axle-box-side locking members 9a and 9b. A structure for retaining the chevron rubber springs 7a and 7b is provided at the bogie frame 3 side.

Figure 6:
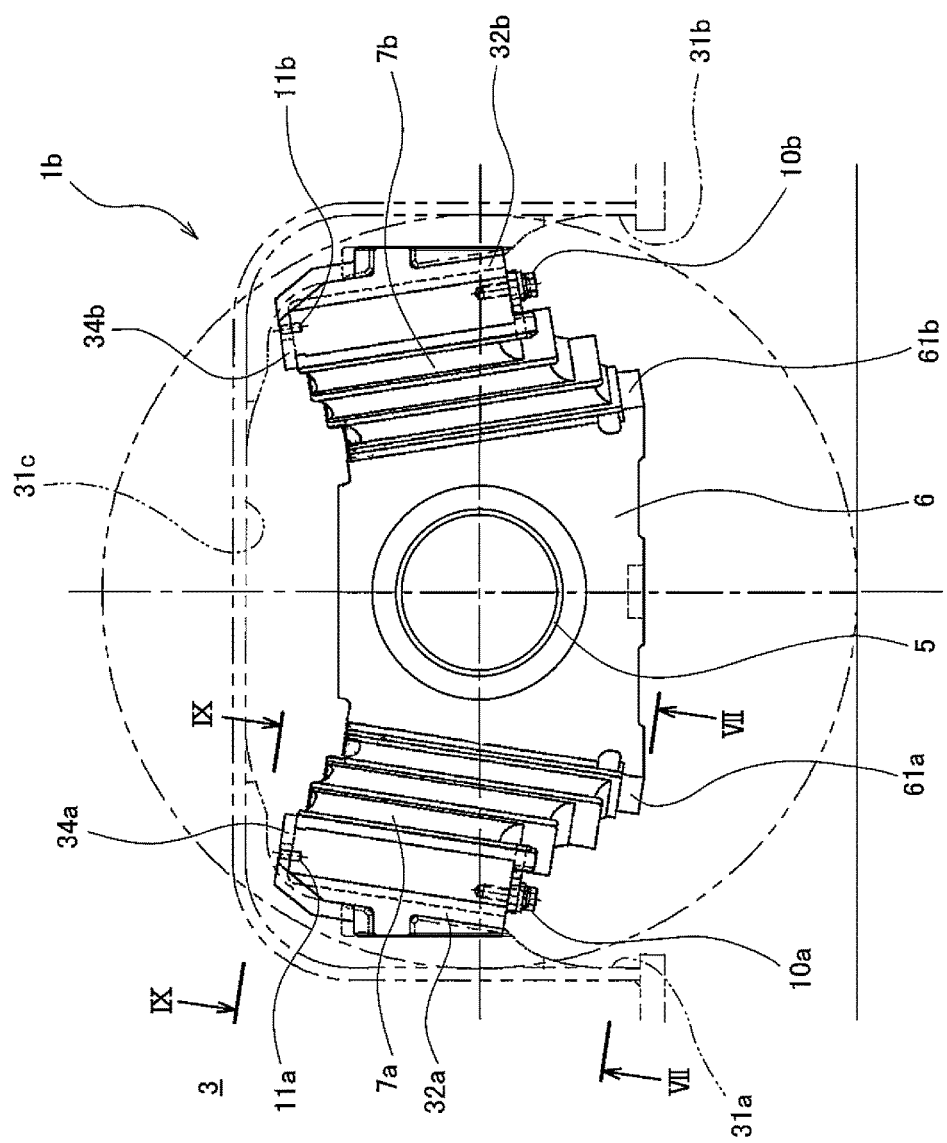
FIG. 6 is an essential-part enlarged view showing the vicinity of an axle box of a railcar bogie according to Embodiment 2.
Figure 7:
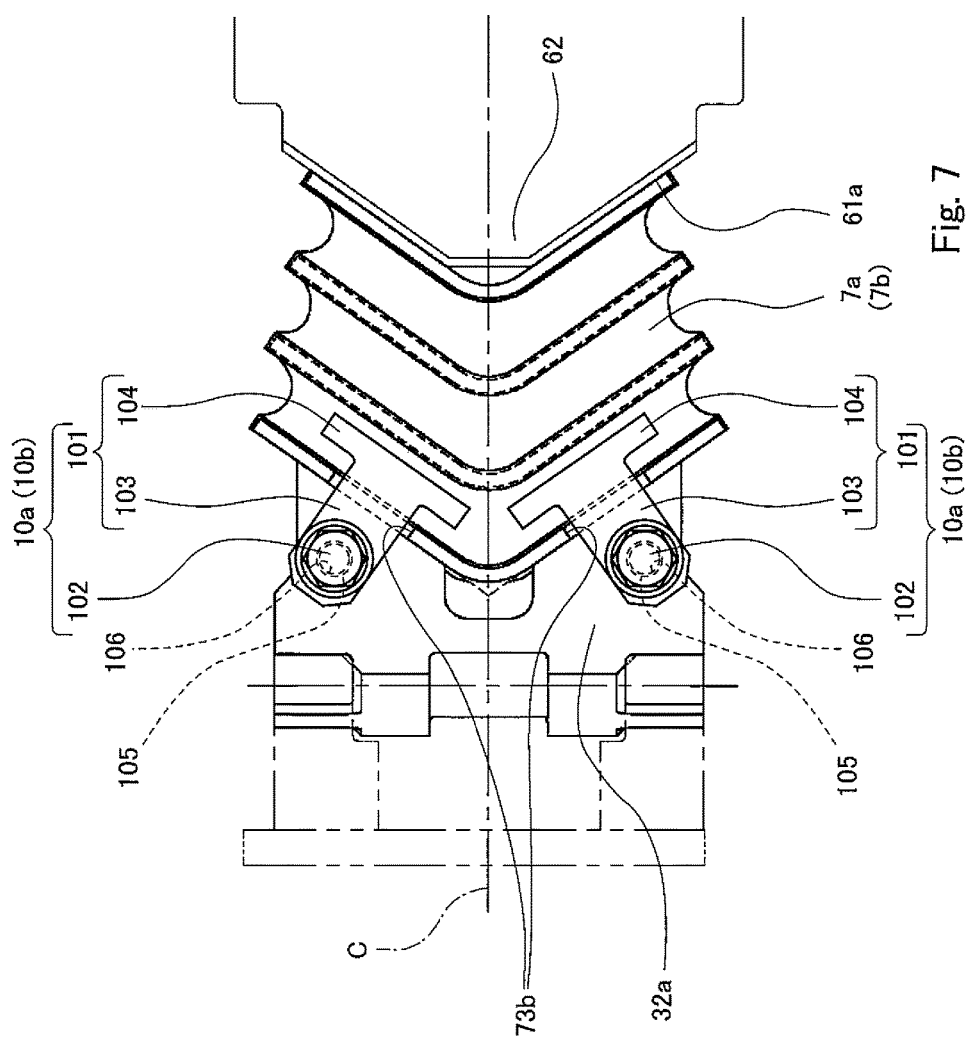
FIG. 7 is a view of the structure in the vicinity of the axle box of the railcar bogie shown in FIG. 6, the view being taken along line VII-VII of FIG. 6 and seen in the direction of the arrows of line VII-VII.

FIG. 6 is an essential-part enlarged view showing the vicinity of an axle box 6 of the bogie 1b. FIG. 7 is a view of the structure in the vicinity of the axle box 6 of the bogie 1b shown in FIG. 6, the view being taken along line VII-VII of FIG. 6 and seen in the direction of the arrows of line VII-VII. It should be noted that FIG. 7 shows the bogie 1b in the assembled state. As shown in FIG. 6 and FIG. 7, the bogie 1b includes a pair of bogie-frame-side supporting members 10a and 10b, which is provided, in a removable manner, on the lower portions of fixing portions of the bogie frame 3 to which the chevron rubber springs 7a and 7b are fixed, i.e., on the lower portions of the rubber spring receivers 32a and 32b, such that the bogie-frame-side supporting members 10a and 10b are positioned under the other ends of the respective chevron rubber springs 7a and 7b. In the disassembled state, the bogie-frame-side supporting members 10a and 10b contact the lower portions of the other ends of the chevron rubber springs 7a and 7b from below via notches 73b, thereby supporting the chevron rubber springs 7a and 7b. The bogie-frame-side supporting members 10a and 10b herein are realized by fitting the above-described axle-box-side locking members 9a and 9b to the rubber spring receivers 32a and 32b in the opposite direction.

Figure 8:
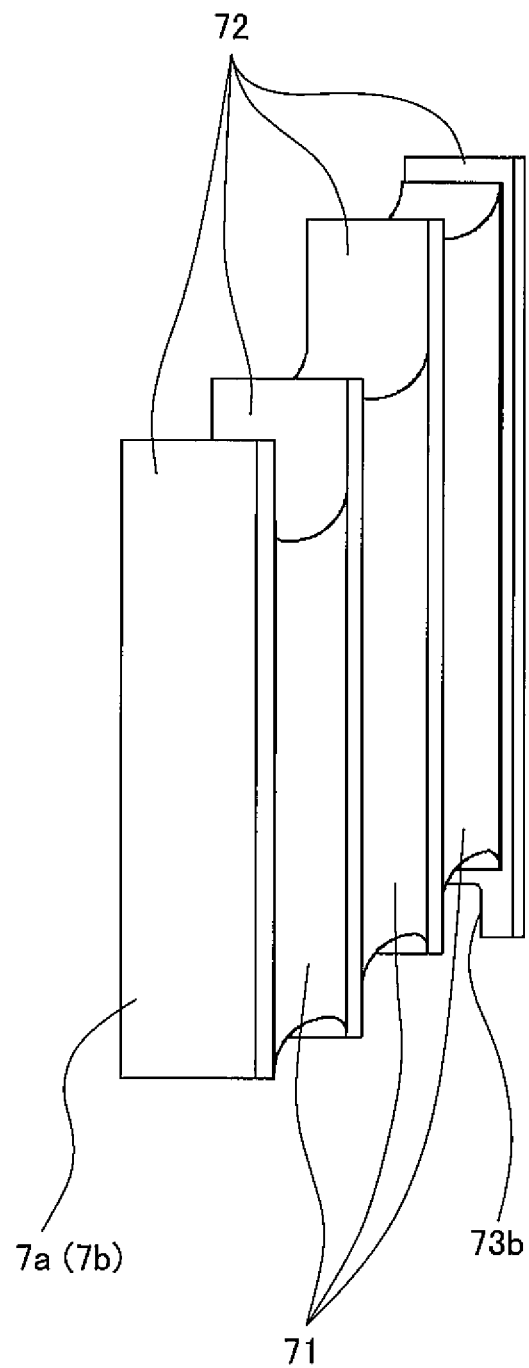
FIG. 8 is a perspective view showing each chevron rubber spring of the railcar bogie of FIG. 6, the chevron rubber spring being cut in half.

FIG. 8 is a perspective view showing the chevron rubber spring 7a or 7b of the bogie 1b, the chevron rubber spring being cut in half. As shown in FIG. 8, a notch 73b is formed in the lower portion of the hard layer 72 of the other end of each of the chevron rubber springs 7a and 7b. The hard layer 72 extends downward beyond the lower end of the adjacent elastic layer 71. Similar to the axle-box-side locking members 9a and 9b, each of the bogie-frame-side supporting members 10a and 10b includes a stopper 101 and a fastener 102. The stopper 101 is a plate-shaped member substantially T-shaped when seen in plan view. The stopper 101 includes a neck portion 103 and a head portion 104. A through-hole 105 is formed in one end of the neck portion 103, and the head portion 104 is formed at the other end of the neck portion 103. The fastener 102 is inserted in the through-hole 105 of the stopper 101, thereby fastening the stopper 101 to the lower portion of the rubber spring receiver 32a or 32b. The fastener 102 herein is a bolt 102, and is screwed into a screw hole 106, which is formed in the lower portion of each of the rubber spring receivers 32a and 32b. It should be noted that each of the bogie-frame-side supporting members 10a and 10b may be constituted by a plurality of sets of stoppers 101 and fasteners 102, each set including one stopper 101 and one fastener 102. In the bogie 1b, each of the bogie-frame-side supporting members 10a and 10b is constituted by two sets of stoppers 101 and fasteners 102, which are arranged such that the two sets are spaced apart from each other in the width direction, so that the lower portion of the hard layer 72 of each of the chevron rubber springs 7a and 7b can be supported with a proper balance in the width direction. Each stopper 101 is disposed such that the neck portion 103 is positioned in the notch 73b, and the head portion 104 is positioned below the elastic layer 71 that is adjacent to the hard layer 72 of the other end of the chevron rubber spring 7a or 7b. The head portion 104 is larger than the notch 73b. In the disassembled state, the friction force decreases between the chevron rubber springs 7a and 7b and the bogie frame 3 as well as between the chevron rubber springs 7a and 7b and the axle box 6. This tends to cause falling or displacement of the chevron rubber springs 7a and 7b. In such a case, the neck portion 103 contacts the notch 73b of the hard layer 72, and the head portion 104 contacts the hard layer 72. In this manner, each of the chevron rubber springs 7a and 7b is supported from below.

Figure 9:
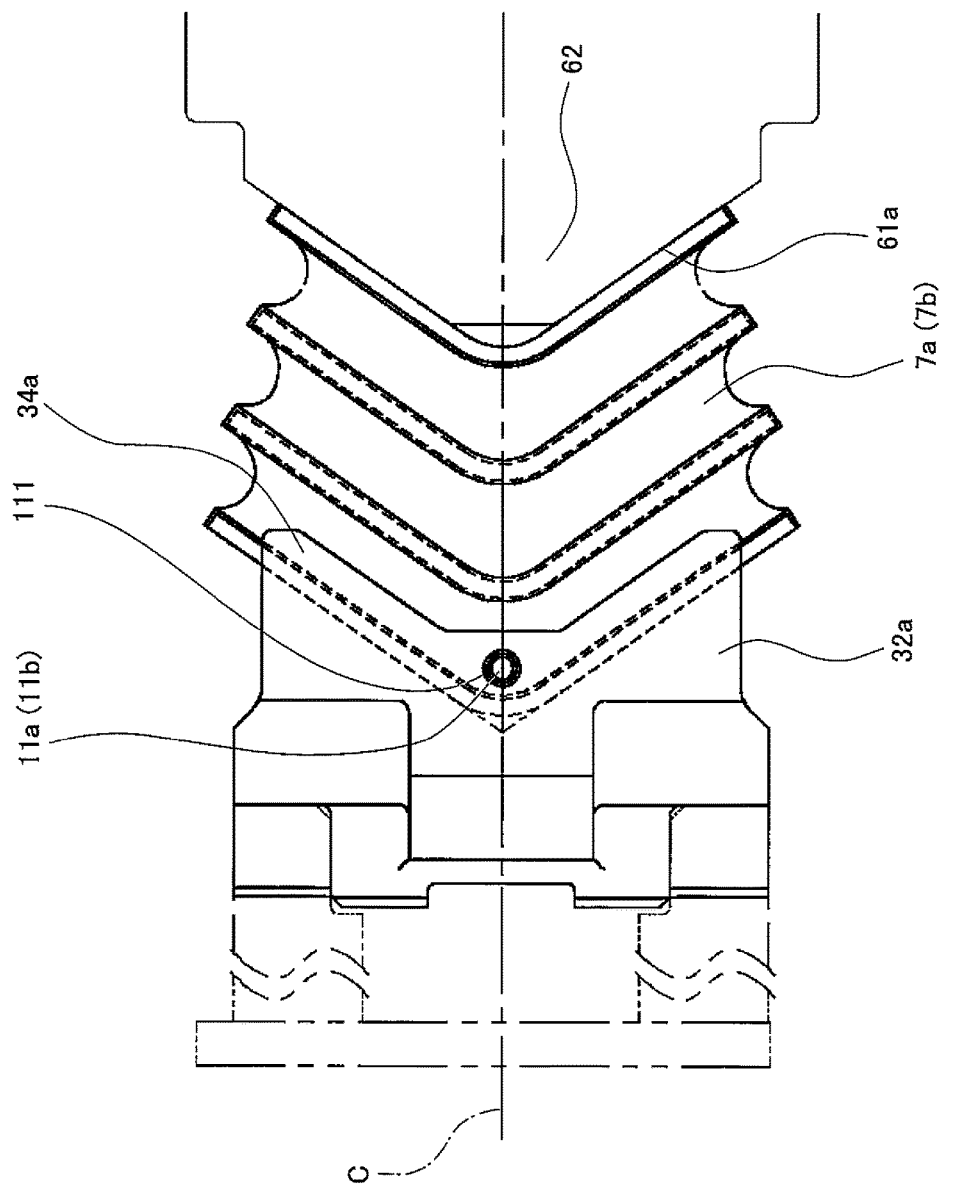
FIG. 9 is a view of the structure in the vicinity of the axle box of the railcar bogie shown in FIG. 6, the view being taken along line IX-IX of FIG. 6 and seen in the direction of the arrows of line ix-IX.

FIG. 9 is a view of the structure in the vicinity of the axle box 6 of the bogie 1b shown in FIG. 6, the view being taken along line IX-IX of FIG. 6 and seen in the direction of the arrows of line IX-IX. It should be noted that FIG. 9 shows the bogie 1b in the assembled state. As shown in FIG. 6 and FIG. 9, the bogie 1b includes a pair of bogie-frame-side locking members 11a and 11b, such that the locking members 11a and 11b are positioned above the other ends of the respective chevron rubber springs 7a and 7b. The bogie-frame-side locking members 11a and 11b herein are provided in such a manner as to project downward from the displacement preventing portions 34a and 34b, which are provided at the top of the rubber spring receivers 32a and 32b. Each of the bogie-frame-side locking members 11a and 11b projecting downward includes a single pin 111. It should be noted that, alternatively, a plurality of pins 111 may be used. In the bogie 1b, each of the locking members 11a and 11b includes a single pin 111. The pin 111 extends from each of the displacement preventing portions 34a and 34b, such that the pin 111 is adjacent to the center of the hard layer 72 (i.e., adjacent to the bottom of the valley of the V shape) of the bogie-frame-side end portion of each of the chevron rubber springs 7a and 7b. In addition, the pin 111 extends such that, in a certain height range, the pin 111 overlaps the hard layer 72 of the bogie-frame-side end portion of each of the chevron rubber springs 7a and 7b. Accordingly, in the disassembled state, part of the pin 111 contacts the upper portion of the hard layer 72. In this manner, the displacement preventing portions 34a and 34b and the chevron rubber springs 7a and 7b are connected, and the upper portions of the other ends of the chevron rubber springs 7a and 7b are locked so that the upper portions of the other ends of the chevron rubber springs 7a and 7b will not be spaced apart from the rubber spring receivers 32a and 32b by a certain space (e.g., 5 to 10 mm) or more. This makes it possible to prevent the chevron rubber springs 7a and 7b supported by the bogie-frame-side supporting members 10a and 10b from tilting downward to fall off or to become displaced. As described above, in the assembled state, the chevron rubber springs 7a and 7b are retained between the bogie frame 3 and the axle box 6 by friction force that is generated owing to the spring force of the chevron rubber springs 7a and 7b. Therefore, in the assembled state, a gap may be formed between the hard layer 72 and the pin 111 of each of the bogie-frame-side locking members 11a and 11b, and thereby the bogie-frame-side locking members 11a and 11b may be prevented from locking the chevron rubber springs 7a and 7b in the assembled state.

In the assembling work of the bogie 1b, the chevron rubber springs 7a and 7b are placed such that the hard layers 72 of the other ends of the chevron rubber springs 7a and 7b are in contact with the valley portions 33 of the rubber spring receivers 32a and 32b of the bogie frame 3, and such that the pins 111 are positioned at the center of the hard layers 72 of the other ends of the chevron rubber springs 7a and 7b (i.e., positioned at the bottom of the valley of the V shape). Thereafter, the stoppers 101 are placed such that the stoppers 101 pass through the notches 73b, which are formed in the lower portions of the hard layers 72 of the other ends of the chevron rubber springs 7a and 7b, and the stoppers 101 are fastened to the rubber spring receivers 32a and 32b by the fasteners 102. Accordingly, the chevron rubber springs 7a and 7b are supported by the bogie-frame-side supporting members 10a and 10b, which contact the chevron rubber springs 7a and 7b from below, and the upper portions of the other ends of the chevron rubber springs 7a and 7b are locked by the bogie-frame-side locking members 11a and 11b. Then, the bogie frame 3 is, together with the chevron rubber springs 7a and 7b, set on the wheelsets 4, and thus the assembling work is completed. It should be noted that the arrangement of the wheelsets 4 is the same as in Embodiment 1. As described above, during the assembling work of the bogie 1b, the chevron rubber springs 7a and 7b are supported by the bogie-frame-side supporting members 10a and 10b from below, and the upper portions of the other ends of the chevron rubber springs 7a and 7b are locked by the bogie-frame-side locking members 11a and 11b. Accordingly, the chevron rubber springs 7a and 7b are retained on the rubber spring receivers 32a and 32b, i.e., on the bogie frame 3.

The disassembling work according to Embodiment 2 is different from the disassembling work according to Embodiment 1 in that, during the disassembling work according to Embodiment 2, the chevron rubber springs 7a and 7b are retained at the bogie frame 3 side. Specifically, during the disassembling work of the bogie 1b according to the present embodiment, the chevron rubber springs 7a and 7b are supported by the bogie-frame-side supporting members 10a and 10b from below, and the upper portions of the other ends of the chevron rubber springs 7a and 7b are locked by the bogie-frame-side locking members 11a and 11b. Accordingly, the chevron rubber springs 7a and 7b are retained on the rubber spring receivers 32a and 32b. In the case of removing the chevron rubber springs 7a and 7b from the rubber spring receivers 32a and 32b after the disassembling work of the bogie 1b, the chevron rubber springs 7a and 7b can be removed by merely removing the bogie-frame-side supporting members 10a and 10b.

As described above, with the simple structure including the bogie-frame-side supporting members 10a and 10b and the bogie-frame-side locking members 11a and 11b, the bogie 1b according to the present embodiment can retain the chevron rubber springs 7a and 7b at the bogie frame 3 side even if the bogie frame 3 and the wheelset units are in the disassembled state, while suppressing an increase in the manufacturing cost or maintenance cost of the bogie 1b. That is, even if the fixed state between the chevron rubber springs 7a and 7b and the bogie frame 3 as well as between the chevron rubber springs 7a and 7b and the axle box 6 is released, the chevron rubber springs 7a and 7b can be retained at the bogie frame 3 side. Although the assembling work and disassembling work of conventional bogies require workers to support the chevron rubber springs provided for each axle box, the bogie 1 according to the present embodiment requires no workers to be assigned to such supporting work. This makes it possible to reduce the manufacturing cost or maintenance cost of the bogie 1.

Although the bogie according to the present embodiment is configured such that the bogie-frame-side locking members are provided on the displacement preventing portions of the rubber spring receivers, the bogie-frame-side locking members are not thus limited. The bogie-frame-side locking members may be provided in such a manner as to project downward from the third facing portion, which is positioned above the rubber spring receivers.

Embodiment 3

The fundamental structure according to Embodiment 3 is similar to the structures according to Embodiment 1 and Embodiment 2 described above. In a description below regarding a bogie 1c according to Embodiment 3, only the differences from Embodiment 1 and Embodiment 2 are described. The same components as those described in Embodiment 1 and Embodiment 2 are denoted by the same reference signs as those used in Embodiment 1 and Embodiment 2, and the description of such components is omitted.

(Structure for Retaining Axle Spring)

The bogie 1c according to Embodiment 3 includes a combination of the structure for retaining the chevron rubber springs 7a and 7b of the bogie 1 according to Embodiment 1 and the structure for retaining the chevron rubber springs 7a and 7b of the bogie 1b according to Embodiment 2. That is, a structure for retaining the chevron rubber springs 7a and 7b is provided at both the axle box 6 side and the bogie frame 3 side.

Figure 10:
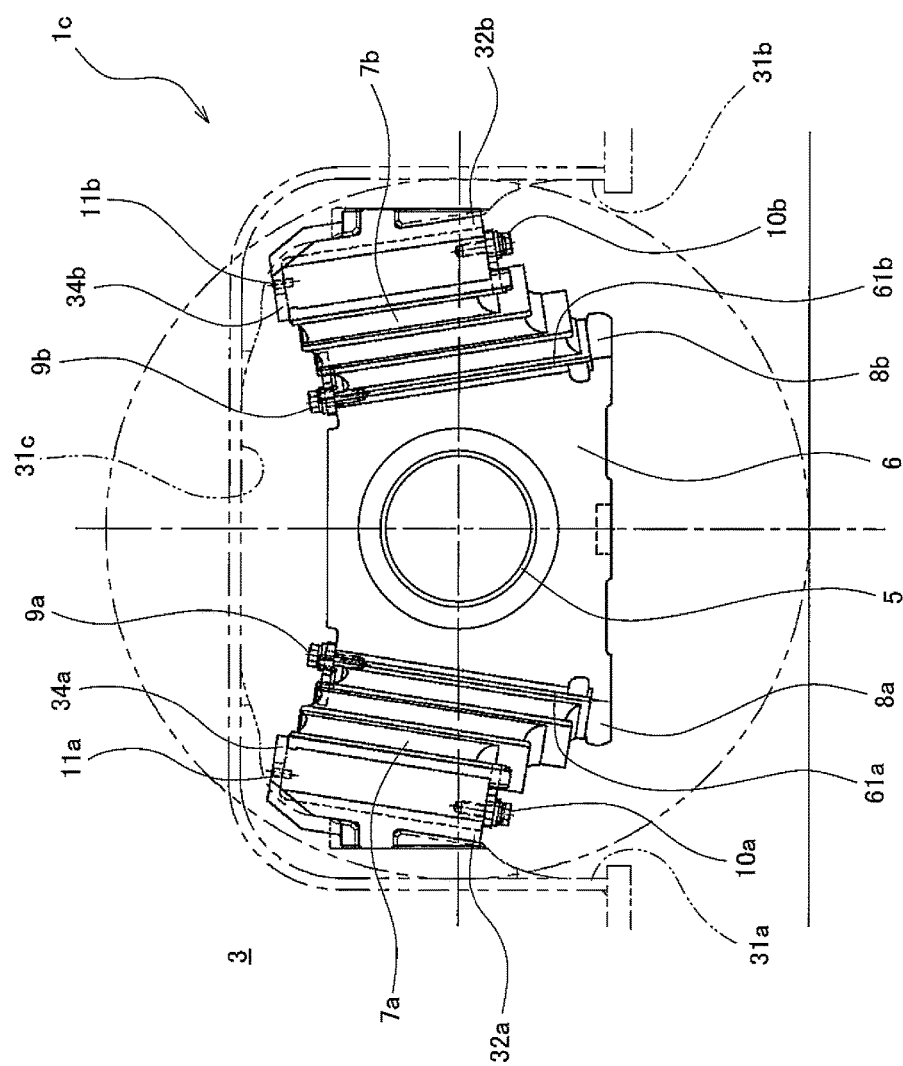
FIG. 10 is an essential-part enlarged view showing the vicinity of an axle box of a railcar according to Embodiment 3.

FIG. 10 is an essential-part enlarged view showing the vicinity of an axle box 6 of the bogie 1c. As shown in FIG. 10, similar to the bogie 1 according to Embodiment 1, the bogie 1c includes the pair of axle-box-side supporting members 8a and 8b, which is integrally formed on the axle box 6. The axle-box-side supporting members 8a and 8b project substantially horizontally from the respective lower portions of both the side surfaces 61a and 61b of the axle box 6, such that the supporting members 8a and 8b are positioned under the one ends of the respective chevron rubber springs 7a and 7b.

The bogie 1c further includes the axle-box-side locking members 9a and 9b, which are provided on the top of the axle box 6 in a removable manner, such that the locking members 9a and 9b are positioned above the one ends of the respective chevron rubber springs 7a and 7b.

Meanwhile, at the bogie frame 3 side, similar to the bogie 1b according to Embodiment 2, the bogie 1c includes the pair of bogie-frame-side supporting members 10a and 10b, which is provided, in a removable manner, on the lower portions of the rubber spring receivers 32a and 32b, such that the bogie-frame-side supporting members 10a and 10b are positioned under the other ends of the respective chevron rubber springs 7a and 7b. It should be noted that the stoppers 101 and the fasteners 102 of the bogie-frame-side supporting members 10a and 10b may be the same as the above-described stoppers 91 and fasteners 92 of the axle-box-side locking members 9a and 9b. By using the stoppers and fasteners that are common to the axle-box-side locking members 9a and 9b and the bogie-frame-side supporting members 10a and 10b, the stoppers and fasteners can be made compatible between the axle-box-side locking members 9a and 9b and the bogie-frame-side supporting members 10a and 10b, and also, the manufacturing cost or maintenance cost of the stoppers and fasteners can be reduced.

The bogie 1c further includes the pair of bogie-frame-side locking members 11a and 11b, such that the locking members 11a and 11b are positioned above the other ends of the respective chevron rubber springs 7a and 7b. The bogie-frame-side locking members 11a and 11b herein are provided in such a manner as to project downward from the displacement preventing portions 34a and 34b, which are provided at the top of the rubber spring receivers 32a and 32b.

During the assembling work, the structures for retaining the chevron rubber springs 7a and 7b of the bogie 1c according to the present embodiment exert fundamentally the same functions as those exerted by Embodiment 1 and Embodiment 2, and the difference is that since the bogie 1c includes both the structure for retaining the chevron rubber springs 7a and 7b at the bogie frame 3 side and the structure for retaining the chevron rubber springs 7a and 7b at the axle box 6 side, which one of the structure at the bogie frame 3 side and the structure at the axle box 6 side is to be used for retaining the chevron rubber springs 7a and 7b during the assembling work can be selected. In the case of retaining the chevron rubber springs 7a and 7b at the axle box 6 side, the assembling work may be performed in the same manner as described in Embodiment 1. On the other hand, in the case of retaining the chevron rubber springs 7a and 7b at the bogie frame 3 side, the assembling work may be performed in the same manner as described in Embodiment 2.

Similarly, since the bogie 1c according to the present embodiment includes both the structure for retaining the chevron rubber springs 7a and 7b at the bogie frame 3 side and the structure for retaining the chevron rubber springs 7a and 7b at the axle box 6 side, which one of the structure at the bogie frame 3 side and the structure at the axle box 6 side is to be used for retaining the chevron rubber springs 7a and 7b during the disassembling work can be selected. In the case of retaining the chevron rubber springs 7a and 7b at the axle box 6 side, the disassembling work may be performed in the same manner as described in Embodiment 1 after removing the bogie-frame-side supporting members 10a and 10b. On the other hand, in the case of retaining the chevron rubber springs 7a and 7b at the bogie frame 3 side, the disassembling work may be performed in the same manner as described in Embodiment 2 after removing the axle-box-side locking members 9a and 9b.

As described above, with the simple structure including the axle-box-side supporting members 8a and 8b, the axle-box-side locking members 9a and 9b, the bogie-frame-side supporting members 10a and 10b, and the bogie-frame-side locking members 11a and 11b, the bogie 1c according to the present embodiment can retain the chevron rubber springs 7a and 7b at the axle box 6 side or at the bogie frame 3 side even if the bogie frame 3 and the wheelset units are in the disassembled state, while suppressing an increase in the manufacturing cost or maintenance cost of the bogie 1c. That is, even if the fixed state between the chevron rubber springs 7a and 7b and the bogie frame 3 as well as between the chevron rubber springs 7a and 7b and the axle box 6 is released, the chevron rubber springs 7a and 7b can be retained at the axle box 6 side or at the bogie frame 3 side. Although the assembling work and disassembling work of conventional bogies require workers to support the chevron rubber springs provided for each axle box, the bogie 1 according to the present embodiment requires no workers to be assigned to such supporting work. This makes it possible to reduce the manufacturing cost or maintenance cost of the bogie 1.

Since the bogie 1c includes both the structure for retaining the chevron rubber springs 7a and 7b at the bogie frame 3 side and the structure for retaining the chevron rubber springs 7a and 7b at the axle box 6 side, which one of the structure at the bogie frame 3 side and the structure at the axle box 6 side is to be used for retaining the chevron rubber springs 7a and 7b during the assembling work and disassembling work can be selected in accordance with the conditions of the work.

It should be noted that the present invention is not limited to the above-described embodiments. Various modifications, additions, or deletions can be made to the embodiments without departing from the spirit of the present invention.

REFERENCE SIGNS LIST 1, 1b, 1c railcar bogie
3 bogie frame
4 wheelset
6 axle box
7 axle spring
7a, 7b rubber spring, chevron rubber spring
8a, 8b axle-box-side supporting member
9a, 9b axle-box-side locking member
10a, 10b bogie-frame-side supporting member
11a, 11b bogie-frame-side locking member

The invention claimed is:

1. A railcar bogie comprising:
an axle box;
a bogie frame surrounding both side surfaces of the axle box in a longitudinal direction of the bogie and an upper surface of the axle box;
a pair of rubber springs interposed between the bogie frame and both the side surfaces of the axle box, respectively, such that one ends of the rubber springs are fixed to the respective side surfaces of the axle box, and such that other ends of the rubber springs are fixed to the bogie frame;
a pair of axle-box-side supporting members provided on respective lower portions of both the side surfaces of the axle box, the axle-box-side supporting members being configured to support the rubber springs by contacting lower portions of the one ends of the rubber springs from below when a fixed state between the rubber springs and the bogie frame as well as between the rubber springs and the axle box is released; and
a pair of axle-box-side locking members each positioned at a top of the axle box in a removable manner, the axle-box-side locking members each being configured to lock an upper portion of the one end of a corresponding one of the rubber springs by contacting the upper portion in a direction from the other end to the one end of the corresponding rubber spring when the fixed state between the rubber springs and the bogie frame as well as between the rubber springs and the axle box is released.

2. The railcar bogie according to claim 1, wherein the rubber springs are chevron rubber springs.

3. The railcar bogie according to claim 1, wherein each of the pair of rubber springs extends obliquely upward from a corresponding one of the side surfaces of the axle box.

4. The railcar bogie according to claim 1, wherein each of the axle-box-side locking members includes a stopper that includes a neck portion and a head portion, the neck portion extending from the axle box through a notch that is formed in the upper portion of the one end of the corresponding rubber spring, the head portion being formed on a distal end of the neck portion and larger than the notch.

5. The railcar bogie according to claim 1, wherein the axle-box-side locking members lock the upper portions of the one ends of the rubber springs, such that the upper portions of the one ends of the rubber springs are not spaced apart from the axle box by a certain space or more.

6. A railcar bogie comprising:
an axle box;
a bogie frame including a pair of rubber spring receivers and surrounding both side surfaces of the axle box in a longitudinal direction of the bogie and an upper surface of the axle box;
a pair of rubber springs interposed between the pair of rubber spring receivers and both the side surfaces of the axle box, such that one ends of the rubber springs are fixed to the respective side surfaces of the axle box, and such that other ends of the rubber springs are fixed to the respective rubber spring receivers;
a pair of bogie-frame-side supporting members provided, in a removable manner, on respective lower portions of fixing portions of the bogie frame to which the rubber springs are fixed, the bogie-frame-side supporting members being configured to support the rubber springs by contacting lower portions of the other ends of the rubber springs from below when a fixed state between the rubber springs and the bogie frame as well as between the rubber springs and the axle box is released; and
a pair of bogie-frame-side locking members provided above the respective fixing portions of the bogie frame to which the rubber springs are fixed, the bogie-frame-side locking members being configured to lock upper portions of the other ends of the rubber springs when the fixed state between the rubber springs and the bogie frame as well as between the rubber springs and the axle box is released.

7. The railcar bogie according to claim 6, wherein the bogie-frame-side locking members lock the upper portions of the other ends of the rubber springs, such that the upper portions of the other ends of the rubber springs are not spaced apart from the fixing portions of the bogie frame by a certain space or more.

8. The railcar bogie according to claim 6, wherein the rubber springs are chevron rubber springs.

9. The railcar bogie according to claim 6, wherein each of the pair of rubber springs extends obliquely upward from a corresponding one of the side surfaces of the axle box.

10. The railcar bogie according to claim 6, wherein
the bogie frame includes displacement preventing portions that extend from the rubber spring receivers and that are positioned over the rubber springs, and
the bogie-frame-side locking members project downward from the displacement preventing portions.

11. A railcar bogie comprising:
an axle box;
a bogie frame including a pair of rubber spring receivers and surrounding both side surfaces of the axle box in a longitudinal direction of the bogie and an upper surface of the axle box;
a pair of rubber springs interposed between the pair of rubber spring receivers and both the side surfaces of the axle box, such that one ends of the rubber springs are fixed to the respective side surfaces of the axle box, and such that other ends of the rubber springs are fixed to the respective rubber spring receivers;
a pair of axle-box-side supporting members provided on respective lower portions of both the side surfaces of the axle box, the axle-box-side supporting members being configured to support the rubber springs by contacting lower portions of the one ends of the rubber springs from below when a fixed state between the rubber springs and the bogie frame as well as between the rubber springs and the axle box is released;

a pair of axle-box-side locking members each provided on top of the axle box in a removable manner, the axle-box-side locking members each being configured to lock an upper portion of the one end of a corresponding one of the rubber springs by contacting the upper portion in a direction from the other end to the one end of the corresponding rubber spring when the fixed state between the rubber springs and the bogie frame as well as between the rubber springs and the axle box is released;

a pair of bogie-frame-side supporting members provided, in a removable manner, on respective lower portions of fixing portions of the bogie frame to which the rubber springs are fixed, the bogie-frame-side supporting members being configured to support the rubber springs by contacting lower portions of the other ends of the rubber springs from below when the fixed state between the rubber springs and the bogie frame as well as between the rubber springs and the axle box is released; and a pair of bogie-frame-side locking members provided above the respective fixing portions of the bogie frame to which the rubber springs are fixed, the bogie-frame-side locking members being configured to lock upper portions of the other ends of the rubber springs when the fixed state between the rubber springs and the bogie frame as well as between the rubber springs and the axle box is released.

12. The railcar bogie according to claim 11, wherein the axle-box-side locking members lock the upper portions of the one ends of the rubber springs, such that the upper portions of the one ends of the rubber springs are not spaced apart from the axle box by a certain space or more, and the bogie-frame-side locking members lock the upper portions of the other ends of the rubber springs, such that the upper portions of the other ends of the rubber springs are not spaced apart from the fixing portions of the bogie frame by a certain space or more.

13. The railcar bogie according to claim 11, wherein the rubber springs are chevron rubber springs.

14. The railcar bogie according to claim 11, wherein each of the pair of rubber springs extends obliquely upward from a corresponding one of the side surfaces of the axle box.

15. The railcar bogie according to claim 11, wherein each of the axle-box-side locking members includes a stopper that includes a neck portion and a head portion, the neck portion extending from the axle box through a notch that is formed in the upper portion of the one end of the corresponding rubber spring, the head portion being formed on a distal end of the neck portion and larger than the notch, the bogie frame includes displacement preventing portions that extend from the rubber spring receivers and that are positioned over the rubber springs, and the bogie-frame-side locking members project downward from the displacement preventing portions.

* * * * *